United States Patent
Bostick et al.

(10) Patent No.: US 10,423,592 B2
(45) Date of Patent: Sep. 24, 2019

(54) AUTO-GENERATION OF MIGRATED USE CASES

(71) Applicant: International Business Machines Corporation, Armonk, NY (US)

(72) Inventors: James E. Bostick, Cedar Park, TX (US); John M. Ganci, Jr., Cary, NC (US); Kimberly G. Starks, Nashville, TN (US); Arvind Singh, Waukegan, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 725 days.

(21) Appl. No.: 14/310,418

(22) Filed: Jun. 20, 2014

(65) Prior Publication Data
US 2015/0370916 A1    Dec. 24, 2015

(51) Int. Cl.
*G06F 16/21*    (2019.01)
(52) U.S. Cl.
CPC .................. *G06F 16/214* (2019.01)
(58) Field of Classification Search
CPC .............................. G06F 17/303; G06F 16/214
USPC ........................................................... 717/104
See application file for complete search history.

(56) References Cited

U.S. PATENT DOCUMENTS

| | | | |
|---|---|---|---|
| 2002/0194053 A1* | 12/2002 | Barrett | G06Q 10/06 705/7.36 |
| 2005/0080785 A1 | 4/2005 | Davison | |
| 2007/0179983 A1* | 8/2007 | Putman | G06F 16/214 |
| 2007/0288888 A1* | 12/2007 | Gentry | G06F 8/10 717/106 |

(Continued)

FOREIGN PATENT DOCUMENTS

WO    2008005152 A2    1/2008

OTHER PUBLICATIONS

Mosley, "When to Migrate Legacy Embedded Applications", [Online], 2006, pp. 77-79, [Retrieved from internet on May 2, 2019], < http://delivery.acm.org/10.1145/1190000/1185656/p77-rnosley.pdf> (Year: 2006).*

(Continued)

*Primary Examiner* — Ziaul A Chowdhury
*Assistant Examiner* — Zengpu Wei
(74) *Attorney, Agent, or Firm* — Garg Law Firm, PLLC; Rakesh Garg; Christopher K. McLane (57) ABSTRACT

An existing use case is associated with a program code. The program code is executed when a portion of the existing use case is executed. The program code is analyzed to identify a reference made by at least one of an input and an output of the program code, referencing an existing data model, which participates in a migration activity and results in a new data model. The reference is modified according to a data mapping to form a modified reference, the data mapping describing a manner of changing a representation of (Continued)

data from a representation in the existing data model to a representation in the new data model, the modified reference referencing the representation of the data in the new data model. The existing use case is modified to use the modified reference relative to the program code, the modifying resulting in a migrated use case.

5 Claims, 5 Drawing Sheets (56) References Cited

U.S. PATENT DOCUMENTS

| | | | |
|---|---|---|---|
| 2008/0046791 A1* | 2/2008 | Bicheno | G06F 11/3688 |
| | | | 714/742 |
| 2008/0077849 A1* | 3/2008 | Adams | G06F 8/10 |
| | | | 715/230 |
| 2009/0228527 A1* | 9/2009 | Wang | G06F 3/0617 |
| 2010/0180256 A1 | 7/2010 | Gorthi et al. | |
| 2012/0011079 A1* | 1/2012 | Kumaran | G06Q 10/067 |
| | | | 705/348 |
| 2012/0101977 A1 | 4/2012 | Kim et al. | |
| 2014/0279890 A1* | 9/2014 | Srinivasan | G06F 16/214 |
| | | | 707/626 |
| 2014/0344313 A1* | 11/2014 | Gau | G06F 17/303 |
| | | | 707/810 |
| 2015/0142858 A1* | 5/2015 | Bryan | G06F 9/5088 |
| | | | 707/809 |
| 2015/0212802 A1* | 7/2015 | McFarlane | G06F 8/443 |
| | | | 717/158 |

OTHER PUBLICATIONS

Lüssem et al, "How to make data migration processes more efficient by using TOGAF", [Online], 2013, pp. 1-6, [Retrieved from internet on May 2, 2019], <https://ieeexplore.ieee.org/stamp/stamp.jsp?tp=&arnumber=6616436> (Year: 2013).*

Khajeh-Hosseini et al, "Cloud Migration: A Case Study of Migrating an Enterprise IT System to IaaS", [Online], 2010, pp. 1-8, [ Retrieved from internet on May 2, 2019], <https://arxiv.org/ftp/arxiv/papers/1002/1002.3492.pdf> (Year: 2010).*

Takeuchi et al; Predicate Argument Structure Analysis for Use Case Description Modeling; IEICE Trans. Inf. & Syst., vol. E95-D, No. 7 Jul. 2012, 1959-1968.

Imam et al; Automated Generation of Use Case Diagrams from Problem Frames using Formal Concept Analysis, 2013 10th International Conference on Information Technology: New Generations, 233-240.

Manral et al; Auto-Discovery VPN Problem Statement and Requirements (RFC7018), Sep. 1, 2013.

Nair et al; System and method for automated test case generation and output verification, Mar. 29, 2011.

* cited by examiner

AUTO-GENERATION OF MIGRATED USE CASES

TECHNICAL FIELD

The present invention relates generally to a method, system, and computer program product for modernizing or migrating existing data. More particularly, the present invention relates to a method, system, and computer program product for auto-generation of migrated use cases that are usable with the migrated data in the same manner as an existing use case is usable with the existing data.

BACKGROUND

Existing data is data that has been created using an outdated or proprietary system, is in an outdated or proprietary format, or is in need of migration to a different system or form, or a combination thereof. Many organizations continue to use systems that no longer meet the organization's needs, have become obsolete, or both. Such systems are generally referred to as legacy systems.

Existing data, or legacy data, generally results from older existing systems, but there are instances where legacy data has prevailed in a data processing environment even after the data processing systems have been modernized or migrated. Migrating legacy data is the process of moving the legacy data from an old model, schema, or structure (collectively, legacy data model) to a new model, schema, or structure (collectively, new data model). The new data model is selected to be more efficient that the legacy data model, to have better compatibility with the modernized systems, to offer improved scalability for future data growth, to provide better security and reliability, or a combination thereof.

SUMMARY

The illustrative embodiments provide a method, system, and computer program product for auto-generation of migrated use cases. An embodiment includes a method for migrating a use case. The embodiment associates an existing use case with a program code, wherein the program code is executed when a portion of the existing use case is executed. The embodiment analyzes the program code to identify a reference made by at least one of an input and an output of the program code, the reference referencing an existing data model, the existing data model participating in a migration activity and resulting in a new data model. The embodiment modifies, using a processor and a memory, the reference according to a data mapping to form a modified reference, the data mapping describing a manner of changing a representation of data from a representation in the existing data model to a representation in the new data model, the modified reference referencing the representation of the data in the new data model. The embodiment modifies the existing use case to use the modified reference relative to the program code, the modifying resulting in a migrated use case.

Another embodiment includes a computer program product for migrating a use case. The embodiment further includes one or more computer-readable tangible storage devices. The embodiment further includes program instructions, stored on at least one of the one or more storage devices, to associate an existing use case with a program code, wherein the program code is executed when a portion of the existing use case is executed. The embodiment further includes program instructions, stored on at least one of the one or more storage devices, to analyze the program code to identify a reference made by at least one of an input and an output of the program code, the reference referencing an existing data model, the existing data model participating in a migration activity and resulting in a new data model. The embodiment further includes program instructions, stored on at least one of the one or more storage devices, to modify the reference according to a data mapping to form a modified reference, the data mapping describing a manner of changing a representation of data from a representation in the existing data model to a representation in the new data model, the modified reference referencing the representation of the data in the new data model. The embodiment further includes program instructions, stored on at least one of the one or more storage devices, to modify the existing use case to use the modified reference relative to the program code, the modifying resulting in a migrated use case.

Another embodiment includes a computer system for migrating a use case. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to associate an existing use case with a program code, wherein the program code is executed when a portion of the existing use case is executed. The embodiment further includes program instructions, stored on at least one of the one or more storage devices for execution by at least one of the one or more processors via at least one of the one or more memories, to analyze the program code to identify a reference made by at least one of an input and an output of the program code, the reference referencing an existing data model, the existing data model participating in a migration activity and resulting in a new data model. The embodiment further includes program instructions, stored on at least one of the one or more storage devices for execution by at least one of the one or more processors via at least one of the one or more memories, to modify the reference according to a data mapping to form a modified reference, the data mapping describing a manner of changing a representation of data from a representation in the existing data model to a representation in the new data model, the modified reference referencing the representation of the data in the new data model. The embodiment further includes program instructions, stored on at least one of the one or more storage devices for execution by at least one of the one or more processors via at least one of the one or more memories, to modify the existing use case to use the modified reference relative to the program code, the modifying resulting in a migrated use case.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A use case is an arrangement of steps, which progress in a defined manner, interact with one or more actors, and achieve one or more goals. A goal in a use case can be a final goal or an intermediate goal.

A step of a use case includes an operation, which is performed by an actor to achieve a goal. An actor in a use case can be a role fulfilled by a component. A component comprises a system or subsystem, such as a data processing system with computer-usable code executing therein for the performance of the role. A component can participate in any number of use cases.

A use case is typically executed by executing one or more software programs (program, programs), which include computer-usable code or instructions. A program used in a use case accepts data as input, and produces data as output.

In many cases, a program of a use case references a legacy data model to locate and receive the input data. The program can also reference the legacy data model to manipulate data therein using the program's output data.

The illustrative embodiments recognize that when existing data is migrated from an old or existing data model to a new data model, all things affected by the existing data must also be taken into consideration. It is not unusual in a typical business environment (domain) to have hundreds of data processing systems participating in thousands of use cases, using millions of lines of code spread across thousands of programs.

The illustrative embodiments recognize that presently, migrating use cases that depend on the existing data to use a new data model is largely a manual task. Software experts have to manually identify the dependencies of a use case on the existing data model, and construct a new or modified corresponding use case that uses the migrated data from the new data model.

The illustrative embodiments recognize that such a manual exercise is expensive, time consuming, and prone to errors. Therefore, an automated method for migrating the uses cases to use new data models, and for generating the migrated use cases is needed.

The illustrative embodiments used to describe the invention generally address and solve the above-described problems and other problems related to migrating use cases while migrating existing data. The illustrative embodiments provide a method, system, and computer program product for auto-generation of migrated use cases.

A domain usually has one or more sub-domains included therein. For example, a domain that encompasses an enterprise is very likely to comprise a financial department—a sub-domain, a warehouse—another sub-domain, and many other sub-domains in a similar manner. The use cases used in the sub-domains can vary greatly from sub-domain to sub-domain.

Furthermore, in a sufficiently complex enterprise, the sub-domains may further include smaller sub-domains. For example, a financial sub-domain may include accounts receivable sub-sub-domain, accounts payable sub-sub-domain, and so on. The domain can thus have any number of layers of sub-domains underneath the domain in a tree structure. The illustrative embodiments are described with respect to a sub-domain only for the clarity of the description and without implying any limitation thereto. An embodiment can be employed for auto-generating migrated use cases at any level in a domain tree within the scope of the illustrative embodiments.

Within a domain, an embodiment identifies a sub-domain whose use cases have to be migrated with the migrating of the existing data of the sub-domain. An embodiment also identifies a component model of the sub-domain, whereby a component in the component model lists all the use cases in which the component participates in the sub-domain.

An embodiment identifies from a given set or library of programs, those programs that participate in a use case in the sub-domain. A program and a use case can have a 1-1, 1-n, n-1, or n-m relationship within the scope of the illustrative embodiments. In a 1-1 relationship a program is only associated with, or called while executing, a particular use case. In a 1-n relationship a program is associated with, or called while executing, a particular set of a number of use cases. In an n-1 relationship a set of a number of programs is only associated with, or called while executing, a particular use case. In an n-m relationship a set of n programs is associated with, or called while executing, a set of m use cases.

An embodiment analyzes a program to identify the program's inputs and outputs. An input, an output, or both of a program, may reference exiting data in an existing data model.

An embodiment constructs, or has access to a data mapping. A data mapping is a mapping between data in an existing data model and data in a new data model. The embodiment uses the data mapping to modify the inputs, the outputs, or a combination thereof as needed, such that the inputs and outputs reference the migrated data in the new data model without changing the business function implemented in the use case.

An embodiment also has access to a use case documentation. The use case documentation provides the use case's dependencies on data in the existing data model. When available, an embodiment uses such documentation instead of, or in addition to the program analysis for performing the modifications to reference the migrated data in the new data model in the manner described earlier.

Once a use case has been modified to reference the new data model, an embodiment produces, or generates automatically, a modified form of the use case. The auto-generated modified use case is usable with the new data model without changing the business function implemented in the original use case. Operating in this manner, one or more embodiments remove or reduce the need for manually migrating use cases during data migration activities.

The illustrative embodiments are described with respect to certain data, data models, domains and sub-domains, use cases, programs, components, operations, business functions, inputs, outputs, references, processes, structures, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
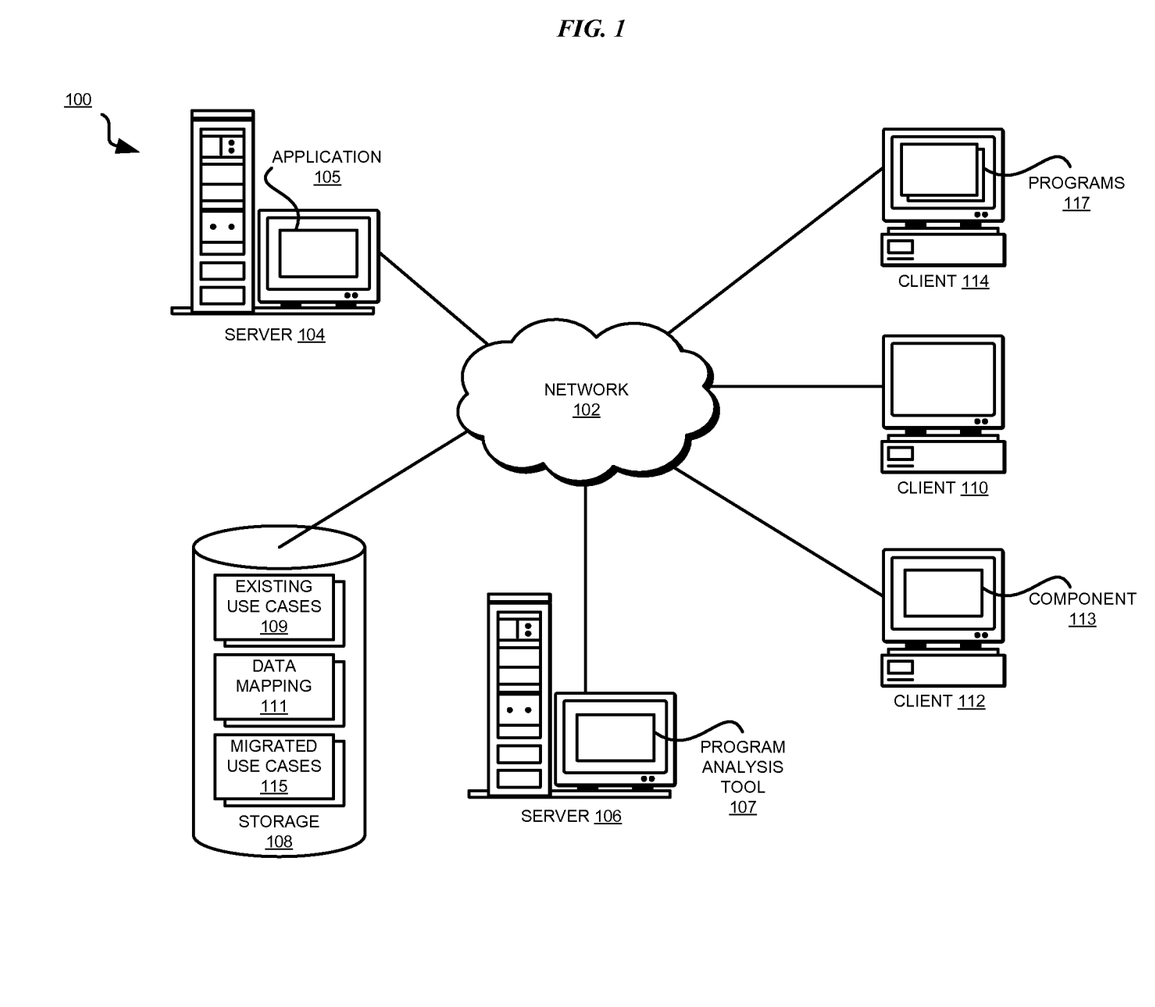
FIG. 1 depicts a block diagram of a network of data processing systems in which illustrative embodiments may be implemented.
Figure 2:
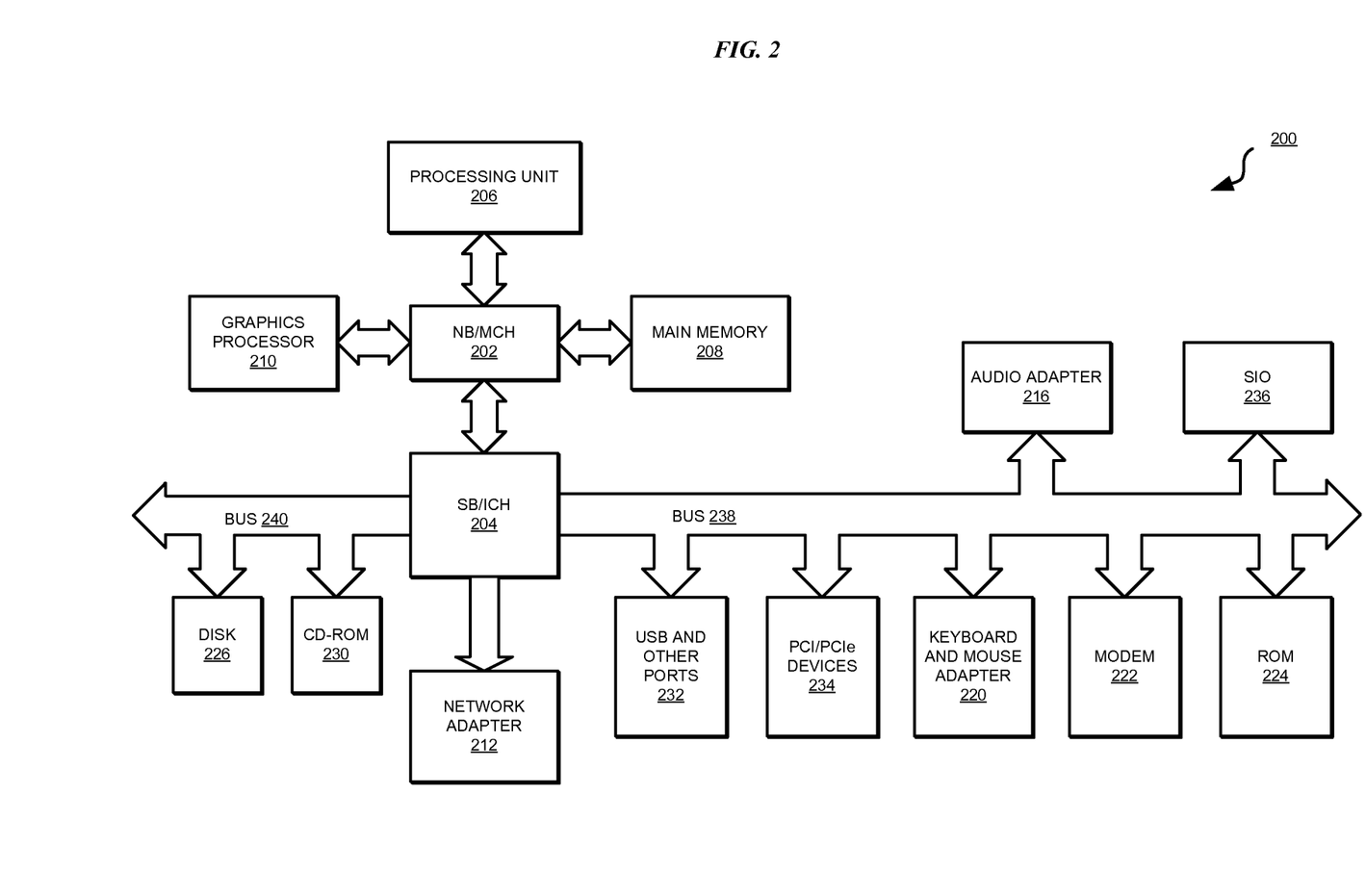
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, an embodiment can be distributed across several data processing systems and a data network as shown, whereas another embodiment can be implemented on a single data processing system within the scope of the illustrative embodiments. For example, Application 105 in server 104 implements an embodiment described herein. Program analysis tool 107 is any suitable system, application, or technology for analyzing program code in the manner described herein. Existing use cases 109 is a collection or set of use cases that use program whose inputs and/or outputs reference an existing data model. Data mapping 111 maps data from an existing data model to a new data model as described herein. Migrated use cases 115 comprise a set of one or more migrated use cases, which use program whose inputs and/or outputs reference a new data model. A migrated use case in migrated use cases 115 has a corresponding existing use case in existing use cases 109, such that the migrated use case preserves the business function implemented in the corresponding existing use case. The artifacts depicted as stored in storage 108 can be stored anywhere in data processing environment 100 such that they are accessible to application 105 for use in the manner of an embodiment. Component 113 is a use case component as described herein, and participates in an existing use case in existing use cases 109 and in a corresponding migrated use case in migrated use cases 115. Programs 117 is a set of programs as described herein. A subset of programs 117 is used in, or called for, an existing use case in existing use cases 109 and in a corresponding migrated use case in migrated use cases 115.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, program analysis tool 107, existing use cases 109, data mapping 111, component 113, migrated use cases 115, and programs 117 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1 and 2 and above-described examples are not meant to imply architectural limitations. For example, data processing system 200 also may be a tablet computer, laptop computer, or telephone device in addition to taking the form of a PDA.

Figure 3:
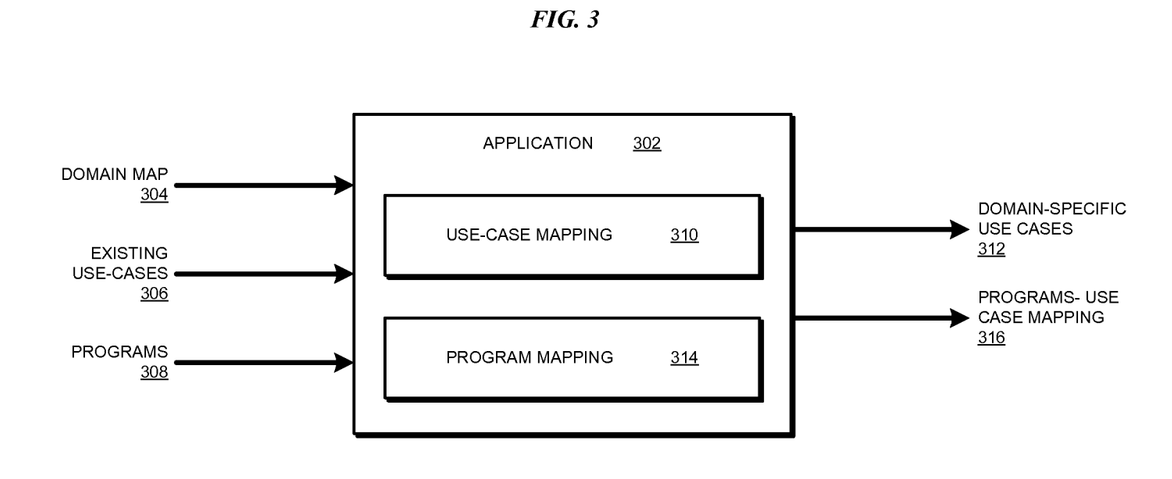
FIG. 3 depicts a block diagram of an example configuration usable for auto-generation of migrated use cases in accordance with an illustrative embodiment.

With reference to FIG. 3, this figure depicts a block diagram of an example configuration usable for auto-generation of migrated use cases in accordance with an illustrative embodiment. Application 302 is an example of application 105 in FIG. 1.

Application 302 receives as input domain map 304, existing use cases 306, and programs 308. Domain map 304 describes an example domain tree, using which the relationships between a domain and sub-domains, sub-domains and their constituent sub-domains, and so on, can be identified up to a level of organizational granularity represented in domain map 304. Existing use cases 306 are an example of existing use cases 109 in FIG. 1. Programs 308 are an example of programs 117 in FIG. 1.

Use case mapping component 310 in application 302 identifies a subset of existing use cases 306 that are associated with, used in, executed for, or otherwise implement business functions of a particular sub-domain in domain map 304. Component 310 causes application 302 to produce output 312. Output 312 comprises a listing of domain-specific or sub-domain-specific subset of existing use cases, from which an existing use case can be selected for migration and auto-generation in the manner of another embodiment.

Program mapping component 314 in application 302 identifies a subset of programs 308 that are associated with, used in, executed for, or otherwise called for a particular existing use case in output 312. Component 314 causes application 302 to produce output 316. Output 316 comprises a listing of existing use case-specific subset of programs 308, from which a program can be selected for analysis in the manner of another embodiment.

Figure 4:
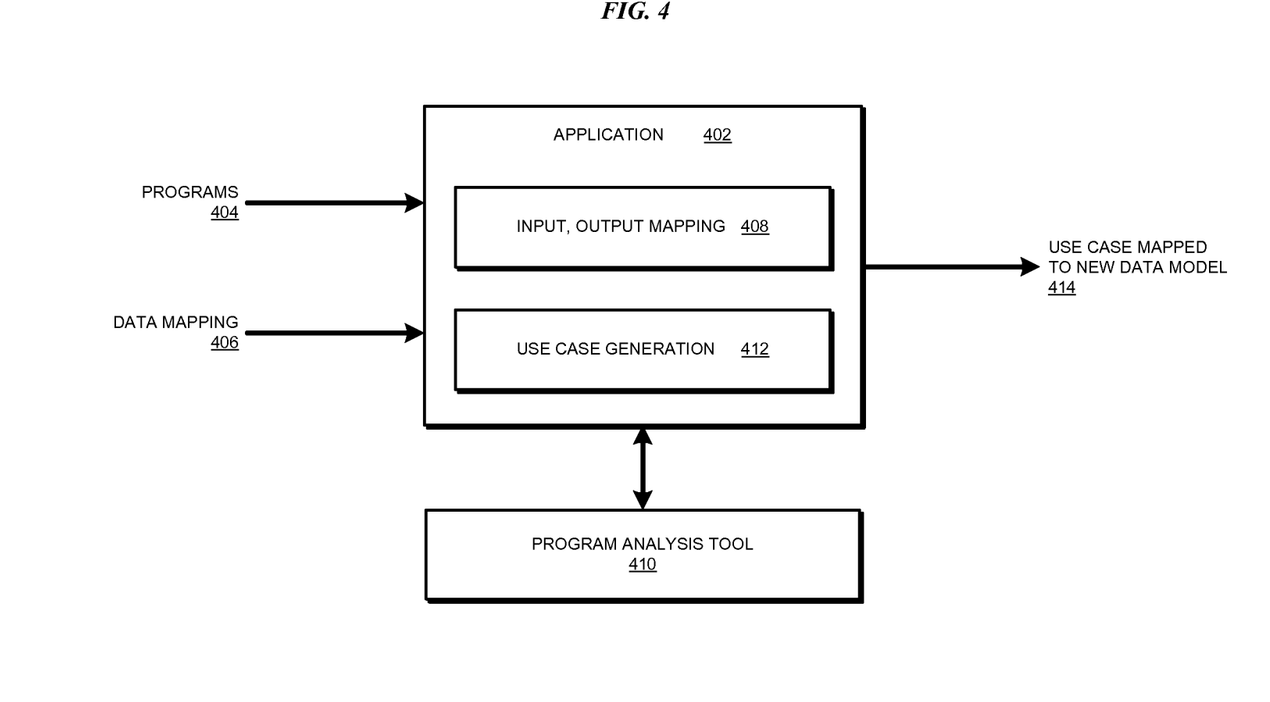
FIG. 4 depicts a block diagram of another example configuration usable for auto-generation of migrated use cases in accordance with an illustrative embodiment.

With reference to FIG. 4, this figure depicts a block diagram of another example configuration usable for auto-generation of migrated use cases in accordance with an illustrative embodiment. Application 402 adds additional features to application 302 in FIG. 3.

Application 402 receives as input one or more programs 404, and data mapping 406. As an example, programs 404 may be a subset of existing use case-specific subset of programs in output 316 in FIG. 3. The subset may include one or more existing use case-specific programs. Data mapping 406 is an example of data mapping 111 in FIG. 1.

Component 408 performs the mapping of inputs, outputs, or both, as the case may be, of programs 404. For example, component 408 passes a program in programs 404 to program analysis tool 410. Program analysis tool 410 returns to component 408 a listing of one or more inputs, one or more outputs, or a combination thereof, that reference data in an existing data model. For example, in one embodiment, a listing returned by tool 410 includes a name of column in a database table, the column being referenced by an input to the existing program. Similarly, in another embodiment, a listing returned by tool 410 includes a name of column in a database table, the column being updated by an output of the existing program.

Component 408 uses the listing returned by tool 410 in conjunction with data mapping 406 to identify how the references to the existing data model, which are used in the input and/or output of the program, have been changed in the new data model. Component 408 replaces, or otherwise modifies a reference to the existing data model in an input or output to the existing program with a reference to an equivalent or analogous data in the new data model according to data mapping 406. Component 408 repeats this replacement or modification process for all inputs and outputs of all programs participating in an existing use case according to input 404.

Component 412 causes application 402 to generate output 414. Output 414 includes a use case that is mapped to the new data model.

For example, assume that the existing use case described how and where in the use case an input is provided to a program, how and where in the use case an output is consumed from the program. Component 412 modifies the existing use case using the modified inputs and outputs produced by component 408 such that the use case continues to provide the inputs and consume the outputs, but by referencing equivalent data in the new data model. In this manner, an embodiment automatically, and without manual intervention, migrates a use case, and produces a use case mapped to the new data model in output 414.

Figure 5:
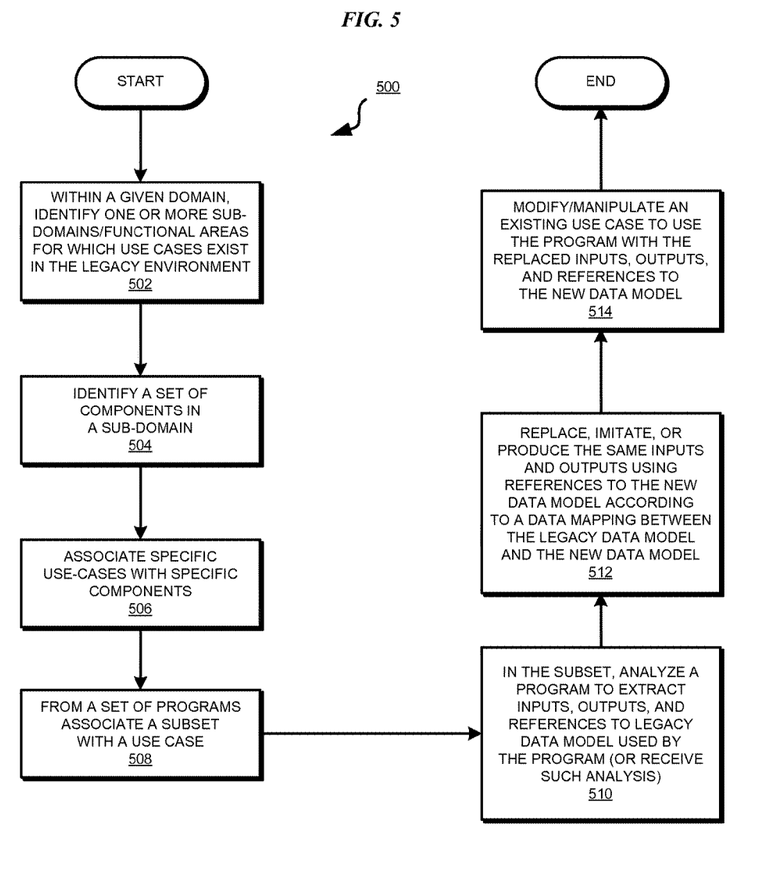
FIG. 5 depicts a flowchart of an example process for auto-generation of migrated use cases in accordance with an illustrative embodiment.

With reference to FIG. 5, this figure depicts a flowchart of an example process for auto-generation of migrated use cases in accordance with an illustrative embodiment. Process 500 can be implemented in application 105 in FIG. 1, 302 in FIG. 3, or 402 in FIG. 4.

The application identifies, within a given domain, one or more sub-domains or functional areas for which one or more use cases exist in the existing legacy data environment (block 502). The application identifies a set of components in the sub-domain (block 504). The application associates specific existing use cases with specific components (block 506).

From a set of existing programs, the application associates a subset of programs with a use case from block 506 (block 508). From the subset of existing programs, the application analyzes a program to extract inputs, outputs, and references to the existing data model used by the program in the legacy environment (block 510). In one embodiment, the program analysis can be performed outside process 500 and the information about the program's inputs, outputs, references can be received from such pre-analysis in block 510.

The application replaces, imitates, or otherwise produces the same inputs and outputs using substitute references to analogous or equivalent data in the new data model (block 512). The operation of block 512 uses the data mapping between the existing and the new data models to produce the inputs and outputs referencing the new data model.

The application modifies or otherwise manipulates an existing use case to use the program with the replaced inputs, outputs, and references to the new data model (block 514). The application ends process 500 thereafter.

One or more blocks of process 500 are repeated for each program associated with each use case for each sub-domain as needed within a particular migration project. The output of block 514 comprises the auto-generated migrated use case according to the illustrative embodiments.

Thus, a computer implemented method, system, and computer program product are provided in the illustrative embodiments for auto-generation of migrated use cases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    migrating a use case, as a part of data migration from an existing data model to a new data model, the use case exercising a program code located in a data processing system, the data processing system implementing a functional operation, wherein the exiting data model resides in a legacy computing environment, wherein the new data model is configured for at least one of improved compatibility, security, reliability, and scalability of a target modernized data processing system, the migrating comprising:
    determining, from a use case documentation, a dependency of the use case on the existing data model;
    analyzing the program code to identify a reference made by at least one of a first input/output of the program code, the reference referencing a data representation in the existing data model, the reference requiring migration from the data representation in the existing data model to a data representation in the new data model;
    replacing, to produce the first input/output from the program code based on the new data model, the reference with a new reference into the new data model;
    modifying, as a part of the replacing, using a processor and a memory, the reference according to a data mapping to form a modified reference, the data mapping
    describing a manner of changing a representation of data from the representation in the existing data model to the representation in the new data model, the modified reference referencing the representation of the data in the new data model;
    imitating a second input/output of the program using a substitute reference; and
    modifying the existing use case to use the modified reference relative to the
    program code, the modifying resulting in a migrated use case from the existing data model to the new data model with the migration of data of the sub-domain, wherein the existing use case provides the input to the program code, and wherein the program code provides an output to the use case, wherein the reference references a table column in the existing data model, the table column representing the data in the existing data model, and wherein the modified reference when used relative to the program code according to the migrated use case causes the migrated use case to perform a business function that is identical to a business function performed by the existing use case.

2. The method of claim 1, wherein the method is embodied in a computer program product comprising one or more computer-readable tangible storage devices and computer-readable program instructions which are stored on the one or more computer-readable tangible storage devices and executed by one or more processors.

3. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

4. A computer program product comprising:
one or more computer-readable tangible storage devices;
program instructions, stored on at least one of the one or more storage devices, to migrate a use case, as a part of data migration from an existing data model to a new data model, the use case exercising a program code located in a data processing system, the data processing system implementing a functional operation, wherein the exiting data model resides in a legacy computing environment, wherein the new data model is configured for at least one of improved compatibility, security, reliability, and scalability of a target modernized data processing system, the migrating comprising:
program instructions, stored on at least one of the one or more storage devices, to determine, from a use case documentation, a dependency of the use case on the existing data model;
program instructions, stored on at least one of the one or more storage devices, to analyze the program code to identify a reference made by at least one of a first input/output of the program code, the reference referencing a data representation in the existing data model, the reference requiring migration from the data representation in the existing data model to a data representation in the new data model;
program instructions, stored on at least one of the one or more storage devices, to replace, to produce the first input/output from the program code based on the new data model, the reference with a new reference into the new data model;
program instructions, stored on at least one of the one or more storage devices, to modify, as a part of the replacing, the reference according to a data mapping to form a modified reference, the data mapping describing a manner of changing a representation of data from the representation in the existing data model to the representation in the new data model, the modified reference referencing the representation of the data in the new data model;
program instructions, stored on at least one of the one or more storage devices, to imitate a second input/output of the program using a substitute reference; and
program instructions, stored on at least one of the one or more storage devices, to modify the existing use case to use the modified reference relative to the program code, the modifying resulting in a migrated use case from the existing data model to the new data model with the migration of data of the sub-domain, wherein the existing use case provides the input to the program code, and wherein the program code provides an output to the use case, wherein the reference references a table column in the existing data model, the table column representing the data in the existing data model, and wherein the modified reference when used relative to the program code according to the migrated use case causes the migrated use case to perform a business function that is identical to a business function performed by the existing use case.

5. A computer system comprising:
one or more processors, one or more computer-readable memories and one or more computer-readable tangible storage devices;
program instructions, stored on at least one of the one or more storage devices for execution by at least one of the one or more processors via at least one of the one or more memories, to migrate a use case, as a part of data migration from an existing data model to a new data model, the use case exercising a program code located in a data processing system, the data processing system implementing a functional operation, wherein the exiting data model resides in a legacy computing environment, wherein the new data model is configured for at least one of improved compatibility, security, reliability, and scalability of a target modernized data processing system, the migrating comprising:
program instructions, stored on at least one of the one or more storage devices for execution by at least one of the one or more processors via at least one of the one or more memories, to determine, from a use case documentation, a dependency of the use case on the existing data model;
program instructions, stored on at least one of the one or more storage devices for execution by at least one of the one or more processors via at least one of the one or more memories, to analyze the program code to identify a reference made by at least one of a first input/output of the program code, the reference referencing a data representation in the existing data model, the reference requiring migration from the data representation in the existing data model to a data representation in the new data model;
program instructions, stored on at least one of the one or more storage devices for execution by at least one of the one or more processors via at least one of the one or more memories, to replace, to produce the first input/output from the program code based on the new data model, the reference with a new reference into the new data model;
program instructions, stored on at least one of the one or more storage devices for execution by at least one of the one or more processors via at least one of the one or more memories, to modify, as a part of the replacing, the reference according to a data mapping to form a modified reference, the data mapping describing a manner of changing a representation of data from the representation in the existing data model to the representation in the new data model, the modified reference referencing the representation of the data in the new data model;
program instructions, stored on at least one of the one or more storage devices for execution by at least one of the one or more processors via at least one of the one or more memories, to imitating a second input/output of the program using a substitute reference; and
program instructions, stored on at least one of the one or more storage devices for execution by at least one of the one or more processors via at least one of the one or more memories, to modify the existing use case to use the modified reference relative to the program code, the modifying resulting in a migrated use case from the existing data model to the new data model with the migration of data of the sub-domain, wherein the existing use case provides the input to the program code, and wherein the program code provides an output to the use case, wherein the reference references a table column in the existing data model, the table column representing the data in the existing data model, and wherein the modified reference when used relative to the program code according to the migrated use case causes the migrated use case to perform a business function that is identical to a business function performed by the existing use case.

\* \* \* \* \*